United States Patent
Dreiling

(10) Patent No.: US 9,924,491 B1
(45) Date of Patent: Mar. 20, 2018

(54) METHOD AND SYSTEM FOR MANAGEMENT OF MOBILE TERMINAL CONNECTION IN RESPONSE TO PAGING FAILURE

(71) Applicant: Sprint Spectrum L.P., Overland Park, KS (US)

(72) Inventor: Ryan P. Dreiling, Lenexa, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 941 days.

(21) Appl. No.: 13/864,742

(22) Filed: Apr. 17, 2013

(51) Int. Cl.
*H04W 68/02* (2009.01)

(52) U.S. Cl.
CPC ................ *H04W 68/02* (2013.01)

(58) Field of Classification Search
CPC .......... H04Q 7/20; H04W 68/02; H04W 4/00; H04W 68/00; H04W 72/00; H04L 12/189; H04M 3/16
See application file for complete search history.

(56) References Cited

U.S. PATENT DOCUMENTS

| | | | | |
|---|---|---|---|---|
| 6,957,276 B1* | 10/2005 | Bahl | ............................. | 709/245 |
| 7,948,991 B1* | 5/2011 | Hart | ....................... | H04L 1/1854 370/395.4 |
| 2009/0017845 A1* | 1/2009 | Wu | ....................... | H04W 68/02 455/458 |
| 2009/0181647 A1* | 7/2009 | Benco | ................... | H04W 68/02 455/413 |
| 2012/0134346 A1* | 5/2012 | Bosch | ................... | H04W 8/085 370/338 |

OTHER PUBLICATIONS

"Interoperability Specification for cdma2000 Air Interface, Revision A," 3GPP2, 3GPP2 C.S0044-A v1.0, Jul. 27, 2007.

* cited by examiner

*Primary Examiner* — Anez Ebrahim

(57) ABSTRACT

Disclosed is a method and system for managing a mobile terminal connection. A paging controller attempts to page a mobile terminal and detects failure of the paging. In response, a packet-network address that had been assigned for the mobile terminal is released and/or a data link layer connection that had been established for the mobile terminal is released.

19 Claims, 5 Drawing Sheets

METHOD AND SYSTEM FOR MANAGEMENT OF MOBILE TERMINAL CONNECTION IN RESPONSE TO PAGING FAILURE

BACKGROUND

Unless otherwise indicated herein, the materials described in this section are not prior art to the claims and are not admitted to be prior art by inclusion in this section.

A cellular wireless network may include a number of base stations that radiate to define wireless coverage areas, such as cells and cell sectors, in which mobile terminals such as cell phones, tablet computers, tracking devices, embedded wireless modules, and other wirelessly equipped communication devices, can operate. In turn, each base station may be coupled with network infrastructure including a network access server (NAS) that provides connectivity with a packet-switched network such as the Internet. With this arrangement, a mobile terminal within coverage of the network may engage in air interface communication with a base station and may thereby communicate via the base station and via the NAS with various entities on the packet-switched network.

When such a mobile terminal enters into coverage of the network, the mobile terminal may register with the network, and the network may work with the mobile terminal to establish a radio link layer connection between a base station and the mobile terminal and a data link layer connection between the NAS and the mobile terminal. Further, the NAS may provide the mobile terminal with an assignment of a network address on the packet-switched network. Outgoing packet-data may then flow from the mobile terminal over the radio link layer connection to the base station, from the base station to the NAS, and from the NAS onto the packet-switched network for routing to its destination. Similarly, incoming packet-data destined to the mobile terminal's assigned network address may arrive at the NAS and may then flow to the base station and over the radio link layer connection to the mobile terminal.

Furthermore, after a threshold period of time of no packet-data flowing over the radio-link layer connection, the network may automatically release the assigned radio link layer connection but maintain the data link layer connection with the NAS and the network address assignment for the mobile terminal, thereby putting the mobile terminal into a dormant mode. With the mobile terminal in the dormant mode, if the NAS receives incoming packet-data destined to the mobile terminal, the network may page the mobile terminal to cause the mobile terminal to work with the network to re-acquire a radio link layer connection over which to receive the packet-data, and the NAS may then send the packet-data to the mobile terminal as described above. Likewise, if a mobile terminal in the dormant mode seeks to transmit outgoing packet-data from its assigned network address, the mobile terminal may similarly work with the network to re-acquire a radio link layer connection, and the mobile terminal may then transmit the packet-data as described above.

OVERVIEW

An issue can arise where a mobile terminal that is registered with a network and has a data link layer connection and network address for engaging in packet-data communication via that network transitions to a state of operation in which the mobile terminal will no longer engage in packet-data communication via the network but where the network continues to attempt delivery of incoming packet-data to the mobile terminal.

This may happen, for instance, in a scenario where the mobile terminal transitions from using the network for packet-data communications to using another system for packet-data communication but does not inform the network of this transition. In that scenario, although the network may release the mobile terminal's radio link layer connection after a period of time as discussed above, the NAS may maintain the mobile terminal's data link layer connection and network address assignment. Consequently, the NAS may continue receiving packet-data destined to the mobile terminal, and the network may continue paging the mobile terminal in an effort to facilitate delivery of that packet-data to the mobile terminal. But the mobile terminal may reject those page attempts or may simply not respond to those page attempts. As a result, valuable network resources would continue to be used unnecessarily in attempting to deliver packet-data to the mobile terminal. Further, the data that has arrived at the NAS for delivery to the mobile terminal may never reach the mobile terminal.

Disclosed herein is a method and system to help overcome this issue. In accordance with the disclosure, a network may respond to failure of paging a mobile terminal by releasing a data link layer connection and/or network address that was in place for the mobile terminal.

In one respect, for instance, the disclosed method may involve a paging controller in a radio access network (RAN) paging a mobile terminal that is registered with the RAN and that has an assigned network address on a packet-switched network accessible via the RAN, where the paging involves wirelessly transmitting one or more page messages destined to the mobile terminal. In turn, the method may involve the paging controller detecting failure of the paging, such as by receiving a page-reject message from the mobile terminal or not receiving any response from the mobile terminal. And the method may then involve, in response to the paging controller detecting the failure of the paging, releasing the network address assigned to the mobile terminal on the packet-switched network.

In another respect, the disclosed system may take the form of a paging controller in a RAN, where the paging controller is configured (i) to page a mobile terminal that is registered with the RAN and that has a data link layer connection with a NAS providing connectivity between the RAN and a packet-switched network, (ii) to detect failure of the paging of the mobile terminal, and (iii) in response to detecting the failure of the paging, to signal to the NAS to cause the NAS to release the data link layer connection.

And in still another respect, the disclosed system may comprise at least one base station, a NAS, and a paging controller. The at least one base station may be configured to engage in radio link layer communication with a mobile terminal, and the NAS may be configured to establish a data link layer connection with the mobile terminal and to provide the mobile terminal with connectivity to a packet-switched network and assignment of a network address on the packet-switched network. Further, the paging controller may be configured (i) to page the mobile terminal via the base station in response to the NAS having received from the packet-switched network packet-data destined to the mobile terminal, (ii) to detect failure of the paging, and (iii) responsive to detecting the failure of the paging, to cause the NAS to release the data link layer connection and the assigned network address.

These as well as other aspects, advantages, and alternatives will become apparent to those of ordinary skill in the art by reading the following detailed description, with reference where appropriate to the accompanying drawings. Further, it should be understood that the description provided in this overview section and elsewhere in this document is provided by way of example only.

DETAILED DESCRIPTION

As noted above, FIG. 1 is simplified block diagram of an example network arrangement in which aspects of the present disclosure can be implemented. It should be understood, however, that these and other arrangements and processes described herein are set forth for purposes of example only, and that other arrangements and elements (e.g., machines, interfaces, functions, orders of elements, etc.) can be added or used instead and some elements may be omitted altogether. Further, those skilled in the art will appreciate that many of the elements described herein are functional entities that may be implemented as discrete components or in conjunction with other components, in any suitable combination and location, and that various disclosed functions can be implemented by any combination of hardware, firmware, and/or software, such as by one or more processors programmed to execute computer instructions for instance.

Figure 1:
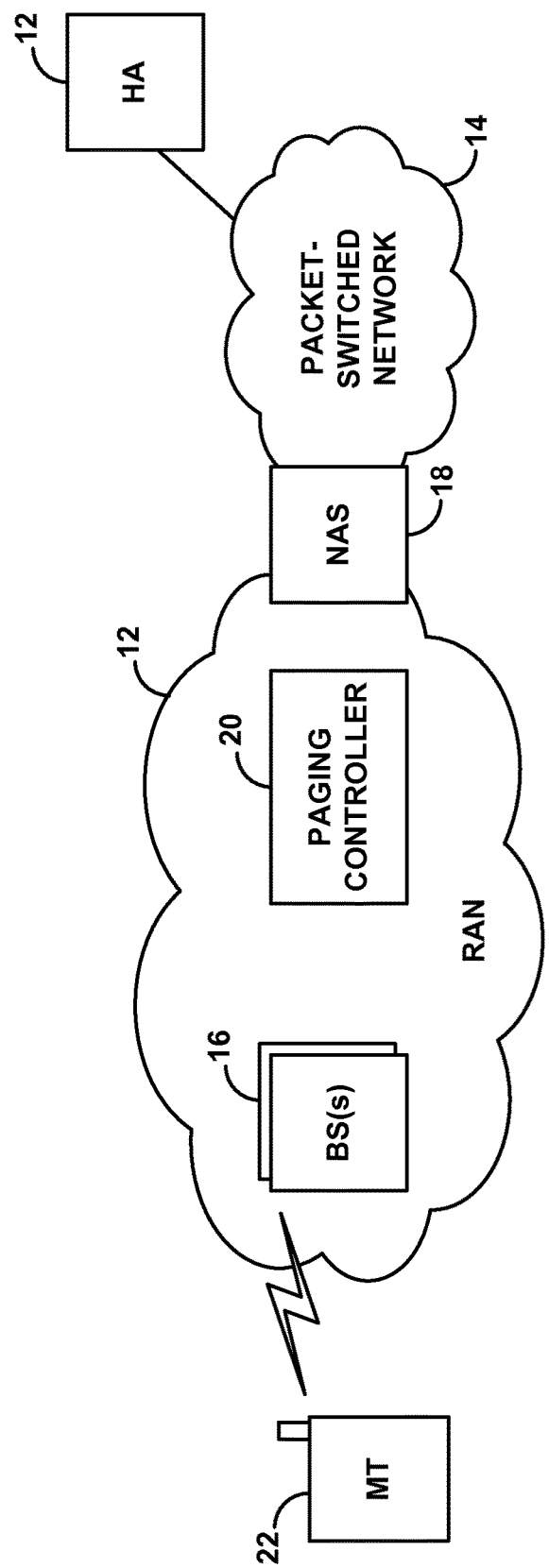
FIG. 1 is a simplified block diagram depicting an example network arrangement in which aspects of the present disclosure can be implemented.

As shown generally in FIG. 1, the network arrangement includes at its core a RAN 12 that functions to provide mobile terminals with access to one or more transport networks such as a representative packet-switched network 14 for instance. As such, the RAN 12 includes one or more base stations 16 that are configured to engage in air interface communication with mobile terminals, and a NAS 18 that functions as a gateway between the RAN 12 and the packet-switched network 14. Further the RAN includes a paging controller 20 that functions to control paging of mobile terminals, as may be necessary to facilitate delivery of incoming packet-data that the NAS receives from the packet-switched network. Shown operating in coverage of the RAN 12 is then a representative mobile terminal 22.

In general, the RAN and mobile terminal may operate in accordance with one or more air interface protocols or "radio access technologies," with communications from the base stations to mobile terminals defining a downlink or forward link and communications from the mobile terminals to the base stations defining an uplink or reverse link. Examples of existing air interface protocols include, without limitation, Code Division Multiple Access (CDMA) (e.g., 1×RTT and 1×EV-DO), Orthogonal Frequency Division Multiple Access (e.g., Long Term Evolution (LTE) or Wireless Interoperability for Microwave Access (WiMAX)), iDEN, TDMA, AMPS, GSM, GPRS, UMTS, EDGE, MMDS, WIFI, and BLUETOOTH. Each protocol may define its own procedures for registration of WCDs, initiation of communications, handoff between coverage areas, and functions related to air interface communication.

In accordance with the air interface protocol, each coverage area may carry communications on one or more carrier frequencies and on specific air interface channels defined in various ways such as frequency division multiplexing, time division multiplexing, and/or code-division multiplexing for instance. By way of example, the downlink of each coverage area may define a pilot or reference channel on which the base station may broadcast a pilot or reference signal, one or more paging channels and/or other control channels on which the base station may broadcast page messages destined to particular mobile terminals, and one or more traffic channels on which to carry bearer traffic (e.g., application data) from the base station to particular mobile terminals. Further, the uplink of each coverage area may define one or more access channels and/or other control channels on which mobile terminals may transmit page response messages to the base station, and one or more traffic channels on which the carry bearer traffic from mobile terminals to the base station.

When a mobile terminal first powers on or enters into coverage of the RAN, the mobile terminal may scan for and identify a strongest pilot or reference signal (e.g., having the highest signal-to-noise ratio) and may register with the RAN by transmitting a registration request or attach request to the base station that provided the pilot or reference signal, thus triggering a registration process in the RAN. This registration process may serve to notify the RAN of the mobile terminal's presence in a particular coverage area and may facilitate authentication and authorization of the mobile terminal to be served by the RAN, and to establish a registration record indicating that the mobile station is registered with the RAN.

As part of the registration process or after registration, the mobile terminal may further acquire a radio link layer connection over which to communicate bearer traffic. For instance, in response to the registration or attach request, or in response to a subsequent origination request, connection request, or the like, from the mobile terminal, the base station may assign to the mobile terminal a radio connection such as one or more air interface traffic channels, and/or a radio link connection identifier, context record, or the like that facilitates air interface communication of bearer traffic to and from the mobile terminal.

Moreover, this process may trigger or lead to establishment of a data link layer connection between the mobile terminal and the NAS 18, and assignment to the mobile terminal of a network address on packet-switched network 12.

By way of example, in response to a mobile terminal's request to acquire a radio link layer connection, perhaps specifically for packet-data communication, and perhaps once the radio link layer connection has been established, the RAN may engage in signaling to cause the NAS to set up a data link layer connection with the mobile terminal. In practice, the data link layer connection may be an industry standard Point to Point Protocol (PPP) connection, and the NAS may engage in signaling with the mobile terminal in accordance with the industry standard Link Control Protocol (LCP) to set up the PPP connection extending between the mobile terminal and the NAS. Alternatively, the data link layer connection may take the form of a bearer connection, such as an evolved packet system (EPS) bearer, defining various inter-component tunnels extending between the mobile terminal and the NAS.

Furthermore, the NAS may facilitate assignment to the mobile terminal of a network address such as an Internet Protocol (IP) address (defining a network layer connection). In practice, for instance, the NAS or an associated entity may apply a Dynamic Host Control Protocol (DHCP) function to select and assign to the mobile terminal an IP address routable on the packet-switched network, transmitting to the mobile terminal an indication of the assigned IP address. Alternatively, the NAS may function as a Mobile-IP foreign agent, and the mobile terminal may transmit to the NAS a Mobile-IP registration request (RRQ) message, which the NAS may forward to a Mobile-IP home agent 24 on the packet-switched network. The Mobile-IP home agent may then select and assign to the mobile terminal an IP address routable on the packet-switched network and establish a binding between that address and a care-of address of the NAS, and may transmit to the mobile terminal a Mobile-IP registration reply (RRP) message, providing an indication of the assigned IP address.

Once the mobile terminal has a radio link layer connection with the base station, a data link layer connection with the NAS, and an assigned network address, the mobile terminal may then engage in packet-data communication on the packet-switched network 12. In particular, the mobile terminal may generate outgoing packets specifying the mobile terminal's assigned network address as a source address and specifying a desired destination address, and carrying bearer traffic as payload, the mobile terminal may transmit those packets over the data link layer connection, via the radio link layer connection, to the NAS, and the NAS may route the packets on the packet-switched network for transmission to their destination. Further, as the NAS receives packets destined to the network address of the mobile terminal, the NAS may transmit those packets over the data link layer connection, via the radio link layer connection to the mobile terminal.

As noted above, the RAN may be configured to release a mobile terminal's radio link layer connection in response to detecting that packet-data has not passed to or from the mobile terminal for a threshold period of time. In practice, the serving base station or other entity in the mobile terminal's packet-data communication path may make this determination and responsively trigger release of the radio link layer connection. Releasing of the radio link layer connection may then involve the base station releasing one or more air interface traffic channels, radio link connection identifiers, context records, or the like from assignment to the mobile terminal, which may free up those resources for use to serve one or more other mobile terminals. And releasing the radio link layer connection will put the mobile terminal into a dormant mode, in which the mobile terminal does not have a radio link layer connection over which to engage in bearer communication but still has a data link layer connection with the NAS 18 and an assigned network address on the packet-switched network 12.

In this dormant mode, when the mobile terminal seeks to transmit packet-data from its assigned network address, the mobile terminal will re-acquire a radio link layer connection over which to engage in the transmission. To do so, for instance, the mobile terminal may transmit an origination request, connection request, or the like to the base station, and as discussed above, the base station may assign to the mobile terminal a radio connection for carrying bearer traffic between the mobile terminal and the base station. The mobile terminal may then transmit the packet-data over the data link layer connection, via the newly assigned radio link layer connection, to the NAS for transmission to its destination.

Likewise, if the NAS receives packet-data destined for a mobile terminal in the dormant mode, the mobile terminal will similarly re-acquire a radio link layer connection over which to receive the packet-data. In this case, however, signaling may pass in the RAN from the NAS or an associated entity to the paging controller 20, and the paging controller will responsively page the mobile terminal to cause the mobile terminal to re-acquire a radio link layer connection. For instance, the paging controller may signal to the base station to cause the base station to transmit on a paging channel one or more page messages destined to the mobile terminal. If the mobile terminal receives such a page message, the mobile terminal may then transmit an origination request, connection request, or the like to the base station as discussed above so as to acquire a radio connection for carrying bearer traffic. And the NAS or associated entity may then transmit the packet-data, via the radio link layer connection, to the mobile terminal.

Figure 2:
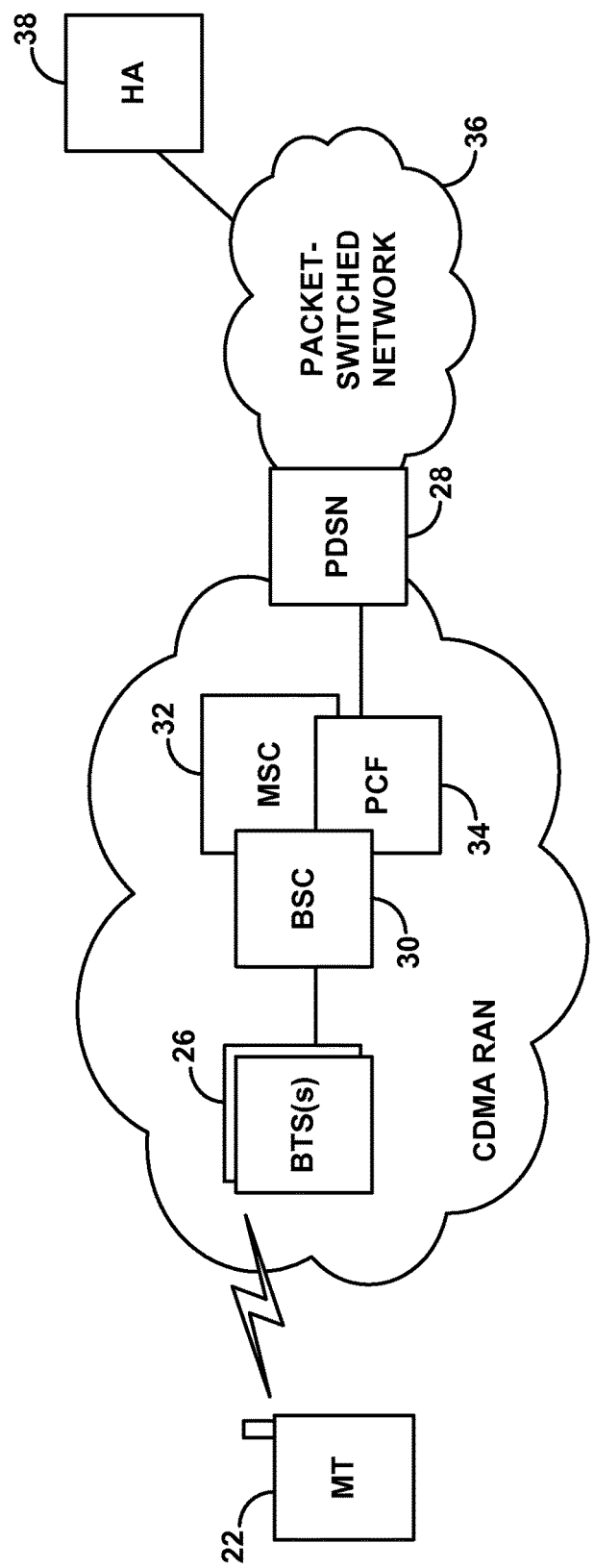
FIG. 2 is a simplified block diagram of an example CDMA network arrangement.
Figure 3:
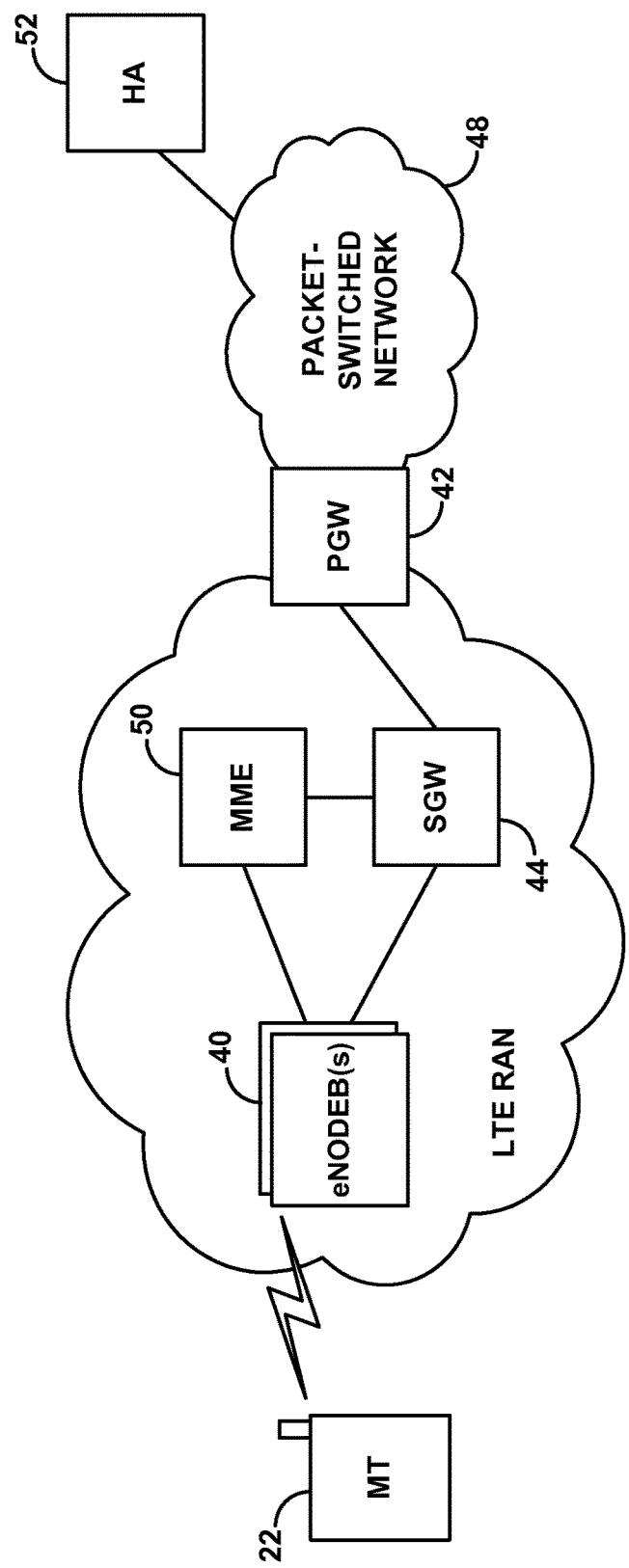
FIG. 3 is a simplified block diagram of an example LTE network arrangement.

FIGS. 2 and 3 are next more specific but still simplified block diagrams depicting example network arrangements in line with the discussion above. FIG. 2 depicts a typical CDMA network arrangement, and FIG. 3 depicts a typical LTE network arrangement. A principle difference between these network arrangements is the configuration and operation of the RAN, including placement and definition of various RAN components and interfaces.

In the CDMA network arrangement of FIG. 2, the one or more base stations are referred to as base transceiver stations (BTSs) 26, and the NAS is referred to as a packet-data serving node (PDSN) 28. As shown, the BTSs are then communicatively linked with a base station controller (BSC) 30 and mobile switching center (MSC) 32, and the BSC or MSC includes or is interconnected with a packet control function (PCF) 34 that is communicatively linked with the PDSN 28, which provides connectivity with a packet-switched network 36. Here, the MSC 32 may function as the paging controller, to facilitate paging the mobile terminal 24, by transmitting to the one or more BTSs one or more page messages to be wirelessly transmitted for receipt by the mobile terminal.

With this arrangement, when the mobile terminal 22 transmits a packet-data origination request over the air to a BTS, the BSC and/or BTS may assign to the mobile terminal a radio link layer connection, such as an air interface traffic channel encoded with a particular Walsh code spreading sequence for instance. Further, the BSC may signal with the PDSN, and the PDSN and mobile terminal may engage in LCP signaling with each other to establish a data link layer connection such as a PPP connection, which would extend between the mobile terminal and the PDSN via the radio link layer connection and the BSC. And still further, the PDSN may assign to the mobile terminal an IP address on packet-switched network 36 or may function as a Mobile-IP foreign agent to facilitate having home agent 38 assign an IP address to the mobile terminal.

In line with the discussion above, after a threshold period of no data flowing to or from the mobile terminal over the assigned radio link, the BTS and/or BSC may release the assigned radio link, but the mobile terminal may retain its PPP link with the PDSN and its assigned IP address. In this case, when the PDSN receives packet-data destined to the mobile terminal, the PDSN may transmit the data to the PCF and the PCF may buffer the data and signal to the MSC to cause the MSC to page the mobile terminal.

The MSC may then transmit one or more page messages via one or more BTSs for receipt by the mobile terminal. However, as noted above, the mobile terminal may reject these page messages or not respond to the page messages. For instance, if the mobile terminal has transitioned to a state of operation in which it will not engage in packet-data communication via the CDMA RAN, such as if the mobile terminal has transitioned to be served with packet-data communication by another network for example, the mobile terminal may transmit via an uplink access channel to its serving BTS a Service Option 0 (zero) page-reject message, declining to request re-acquisition of a radio link layer connection. Or the mobile terminal may simply not respond.

Turning next to the LTE arrangement of FIG. 3, the one or more base stations are referred to as eNodeBs 40, and the NAS is referred to as a packet gateway (PGW) 42. As shown, the eNodeBs are then communicatively linked with a serving gateway (SGW) 44, which is in turn communicatively linked with the PGW 46 that provides connectivity with a packet-switched network 48. Further, the eNodeBs are communicatively linked with a mobility management entity (MME) 50, which is communicatively linked with the SGW 44. (In practice, all of these RAN components may sit as nodes on a wireless service provider's core packet network, and thus the links shown may be logical interfaces over that network.) Here, the MME 42 may function the paging controller, to facilitate paging the mobile terminal, by transmitting to one or more eNodeBs one or more page messages to be wirelessly transmitted for receipt by the mobile terminal.

With this arrangement, when the mobile terminal attaches with the RAN by transmitting an attach request to an eNodeB, the eNodeB may assign to the mobile terminal a radio link layer connection, such as an evolved packet system (EPS) radio bearer connection and/or an associated radio link connection identifier. Further, the eNodeB may signal with the MME, and the MME may signal with the SGW, which may in turn signal with the PGW, to establish an EPS access bearer connection in the form of packet tunnels extending from the eNodeB to the SGW to the PGW. And the PGW may assign to the mobile terminal an IP address on packet-switched network 48 or may function as a Mobile-IP foreign agent to facilitate having home agent 52 assign an IP address to the mobile terminal.

In this arrangement, from the perspective of the PGW, the EPS bearer established for the mobile terminal may be considered a data link layer connection. After a threshold period of no data flowing to or from the mobile terminal over the assigned radio link, the eNodeB may release the assigned radio link, but the mobile terminal may effectively retain its data link layer connection in the form of the EPS bearer connection with the PGW and its assigned IP address. In this case, however, when the PGW receives packet-data destined to the mobile terminal, the PGW may transmit the data to the SGW and the SGW may buffer the data and signal to the MME to cause the MME to page the mobile terminal.

The MME may then transmit one or more page messages via one or more eNodeBs for receipt by the mobile terminal. However, here too, the mobile terminal may reject these page messages or not respond to the page messages. For instance, if the mobile terminal has transitioned to a state of operation in which it will not engage in packet-data communication via the LTE RAN, the mobile terminal may transmit via an uplink access channel to its serving eNodeB a page-reject message, declining request re-acquisition of a radio link layer connection. Or the mobile terminal may simply not respond.

As noted above, one reason why a mobile terminal may reject or not respond to a page message from a RAN through which it has a data link layer connection is that the mobile terminal has moved to be served by a different system. This may happen for instance, if the mobile terminal is dormant in the CDMA RAN of FIG. 2, having a data link layer connection with PDSN 28, and the mobile terminal has transitioned to attach and enter a connected mode of operation with the LTE RAN of FIG. 3 but has not informed the CDMA RAN of this transition. In that scenario, if the PDSN 28 and PGW 46 have insufficient communication with each other or if insufficient Mobile-IP functionality exists between the networks, the IP address assigned to the mobile terminal for communication via PSDN 28 may not become re-associated with PGW 46. Consequently, packet-data destined to the mobile terminal at that IP address may reach the PDSN and the CDMA RAN may attempt to page the mobile terminal to facilitate delivery of the packet-data to the mobile terminal, but the paging will fail and the mobile terminal will not receive the data.

Figure 4:
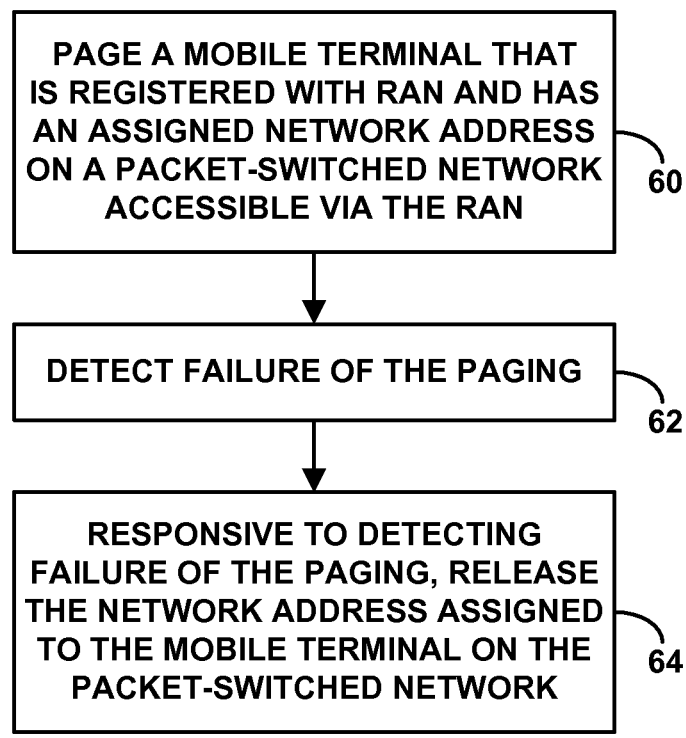
FIG. 4 is a flow chart depicting functions that can be carried out in accordance with the present disclosure.

FIG. 4 is a flow chart depicting functions that can be carried out in accordance with an example implementation of the present method, to help overcome this problem. These functions may be carried out by a paging controller such as the MSC or MME described above for instance and/or by one or more other network entities.

As shown in FIG. 4, at block 60, the method involves a paging controller in a RAN paging a mobile terminal that is registered with the RAN and that has an assigned network address on a packet-switched network accessible via the RAN. At block 62, the method involves the paging controller detecting failure of the paging. And at block 64, the method involves, in response to the paging controller detecting failure of the paging, releasing the network address assigned to the mobile terminal on the packet-switched network.

In line with the discussion above, a NAS (such as a PDSN or PGW) may provide connectivity between the RAN and the packet-switched network, in which case the act of paging the mobile terminal may occur in response to packet-data that has arrived at the NAS from the packet-switched network and is destined to the mobile terminal. For example, in the CDMA network of FIG. 2, the MSC may receive a signal from BSC or PCF indicating that the packet-data has been received, or a PCF in the MSC may receive the packet-data itself, and the MSC may then direct one or more BTSs to page the mobile terminal. Or in the LTE network of FIG. 3, the MME may receive a signal from the SGW indicating that the packet-data has been received, and the MME may then direct one or more eNodeBs to page the mobile terminal.

The act of detecting failure of the paging may then also take various forms. For instance, the act may involve detecting receipt from the mobile terminal, in response to at least one of the one or more page messages, a page-reject message. Or the act may involve detecting absence of receipt from the mobile terminal of response to the one or more page messages, such as detecting non-receipt of a page response from the mobile terminal after a threshold number of page attempts for instance.

Further in line with the discussion above, the NAS may provide connectivity between the RAN and the packet-switched network, and the mobile terminal may have a data link layer connection with the NAS. In that case, the act of releasing the network address assigned to the mobile on the packet-switched network may involve signaling to the NAS to cause the NAS to release the data link layer connection and to release the assigned network address. For instance, in the CDMA network, the MSC may transmit to the PDSN (perhaps via the BSC and/or PCF) an LCP connection-terminate request keyed to an identifier of the mobile terminal, to which the PDSN may be programmed to respond by releasing the mobile terminal's PPP connection and by releasing an IP address assigned to the mobile terminal. And in the LTE network, the MME may transmit to the SGW for transmission in turn to the PGW a release-bearer request to which the PGW may be programmed to respond by releasing the mobile terminal's EPS bearer and similarly releasing the mobile terminal's assigned IP address.

In this method, the NAS may release the mobile terminal's assigned IP address in various ways. If the NAS has assigned the IP address to the mobile terminal, for instance, the NAS may clear a record of that address assignment, and perhaps signal to other nodes on the packet-switched network 12, to indicate that the address is no longer assigned, optimally to avoid having data be routed to the mobile terminal at that address. Alternatively, if a Mobile-IP home agent has assigned the IP address to the mobile terminal, using an address of the NAS as a care-of address for instance, the NAS may transmit to the Mobile-IP home agent on behalf of the mobile terminal a Mobile-IP deregistration request to cause the home agent to clear a record served to bind the IP address with the mobile terminal and/or with the NAS's address, again optimally to avoid having data be routed to the mobile terminal at that IP address.

Figure 5:
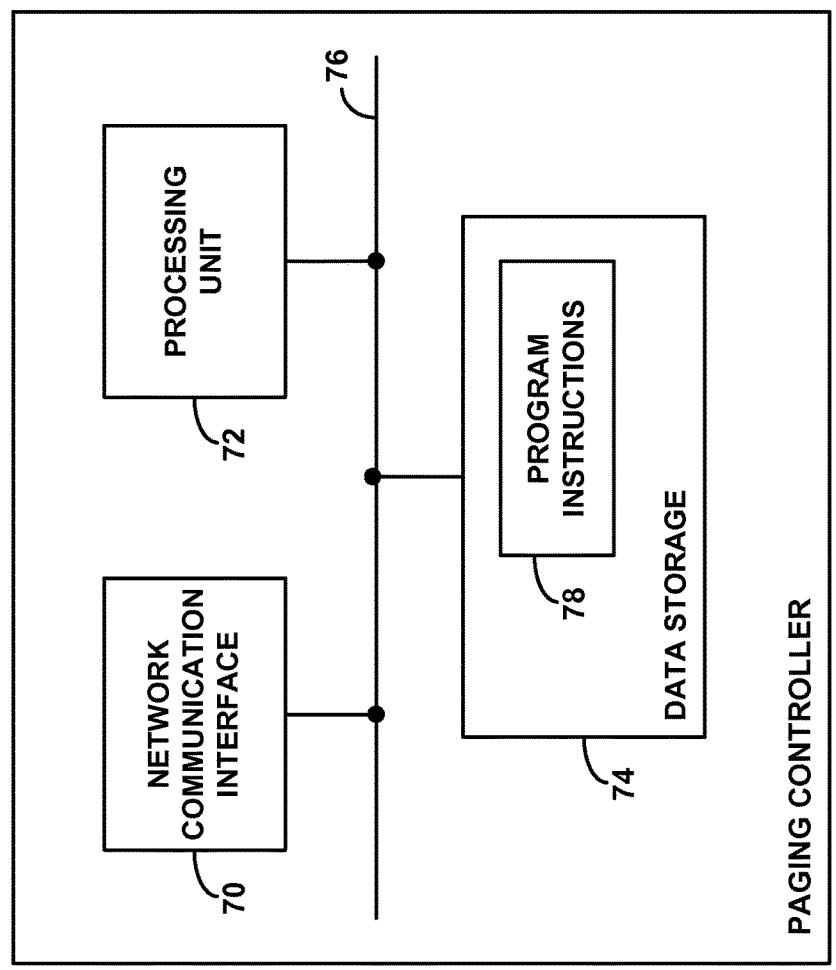
FIG. 5 is a simplified block diagram of a paging controller operable in the arrangements shown in the other figures.

FIG. 5 is next a simplified block diagram of a paging controller operable in a RAN as described above. As shown in FIG. 5, the paging controller includes a network communication interface 70, a processing unit 72, and non-transitory data storage 74, all of which may be communicatively linked together by a system bus, network, or other connection mechanism 76.

Network communication interface 70 functions to facilitate communication with various other network entities shown. For instance, in the CDMA network, interface 70 may facilitate communication with BTS 26, BSC 30, PCF 34, and PDSN 28, or in the LTE network, interface 70 may facilitate communication with eNodeBs 40, SGW 44, and PGW 42. As such, the interface 60 may include one or more network interface modules, such as Ethernet network interface modules for instance or may take any of a variety of other forms, supporting wireless and/or wired communication with these and other components.

Processing unit 72 may then comprise one or more general purpose processors (such as microprocessors) and/or one or more special purpose processors (e.g., application specific integrated circuits). And data storage 74 may comprise one or more volatile and/or non-volatile storage components, such as optical, magnetic, or flash storage, and may be integrated in whole or in part with processing unit 72.

As shown, data storage 74 may hold program instructions 78 that are executable or interpretable by processing unit 72 to carry out various functions described herein. By way of example, these functions may include (i) paging a mobile terminal that is registered with the RAN and that has a data link layer connection with a NAS providing connectivity between the RAN and a packet-switched network, (ii) detecting failure of the paging of the mobile terminal, and (iii) in response to detecting the failure of the paging, signaling directly or indirectly to the NAS to cause the NAS to release the data link layer connection.

Exemplary embodiments have been described above. Those skilled in the art will understand, however, that changes and modifications may be made to these embodiments without departing from the true scope and spirit of the invention.

What is claimed is:

1. A method comprising:
    a paging controller in a radio access network (RAN) paging a mobile terminal that is registered with the RAN and that has an assigned network address on a packet-switched network accessible via the RAN, wherein paging the mobile terminal comprises wirelessly transmitting one or more page messages destined to the mobile terminal;
    the paging controller detecting failure of the paging; and
    responsive to the paging controller detecting the failure of the paging, releasing the network address assigned to the mobile terminal on the packet-switched network.

2. The method of claim 1, wherein a network access server (NAS) provides connectivity between the RAN and the packet-switched network, wherein paging the mobile terminal comprises paging the mobile terminal in response to packet-data that has arrived at the NAS from the packet-switched network and is destined to the mobile terminal.

3. The method of claim 2, wherein paging the mobile terminal in response to the packet-data that has arrived at the NAS from the packet-switched network and is destined to the mobile terminal comprises:
    receiving into the paging controller data selected from the group consisting of (i) a signal indicating receipt of the packet-data and (ii) the packet-data; and
    responsive to receiving the data, directing one or more base stations to transmit the one or more page messages destined to the mobile terminal.

4. The method of claim 1, wherein detecting failure of the paging comprises detecting receipt from the mobile terminal, in response to at least one of the one or more page messages, a page-reject message.

5. The method of claim 1, wherein detecting failure of the paging comprises detecting absence of receipt from the mobile terminal of response to the one or more page messages.

6. The method of claim 1, wherein a network access server (NAS) provides connectivity between the RAN and the packet-switched network, wherein the mobile terminal has a data link layer connection with the NAS, and wherein releasing the network address assigned to the mobile on the packet-switched network comprises:
    signaling to the NAS to cause the NAS to release the data link layer connection and to release the assigned network address.

7. The method of claim 1, wherein signaling to the NAS to cause the NAS to release the data link layer connection and to release the assigned network address comprises transmitting to the NAS a data link layer termination request.

8. The method of claim 7, wherein the data link layer connection is a Point-to-Point protocol connection, and wherein the data link layer termination request comprises a Link Control Protocol (LCP) terminate-request message.

9. The method of claim 7, wherein the assigned network address is an Internet Protocol (IP) address assigned to the mobile terminal by a Mobile-IP home agent, and wherein signaling to the NAS to cause the NAS to release the data link layer connection and to release the assigned network address comprises signaling to the NAS to cause the NAS to release the data link layer connection and to signal to the Mobile-IP home agent to release the assigned network address.

10. The method of claim 9, wherein the mobile terminal is further registered with the Mobile-IP home agent, and wherein signaling to the Mobile-IP home agent to release the assigned network address comprises transmitting to the Mobile-IP home agent on behalf of the mobile terminal a Mobile-IP de-registration request.

11. A paging controller in a radio access network (RAN), wherein the paging controller is configured (i) to page a mobile terminal that is registered with the RAN and that has a data link layer connection with a network access server (NAS) providing connectivity between the RAN and a packet-switched network, (ii) to detect failure of the paging of the mobile terminal, and (iii) in response to detecting the failure of the paging, to signal to the NAS to cause the NAS to release the data link layer connection, wherein the mobile terminal has an assigned network address on the packet-switched network, and wherein signaling to the NAS to cause the NAS to release the data link layer connection further results in release of the assigned network address.

12. The paging controller of claim 11, wherein paging the mobile terminal comprises directing one or more base stations to wirelessly transmit one or more page messages destined to the mobile terminal.

13. The paging controller of claim 12, wherein detecting failure of the paging comprises detecting receipt of a page-reject response from the mobile terminal in response to at least one of the one or more page messages.

14. The paging controller of claim 12, wherein detecting failure of the paging comprises detecting absence of response from the mobile terminal to the one or more page messages.

15. The paging controller of claim 11, wherein the data link layer connection is a Point-to-Point Protocol (PPP) connection, and wherein signaling to the NAS to cause the NAS to release the data link layer connection comprises transmitting to the NAS a Link Control Protocol (LCP) terminate-request message to request closing of the PPP connection.

16. A system comprising:
at least one base station configured to engage in radio link layer communication with a mobile terminal;
a network access server (NAS) configured to establish a data link layer connection with the mobile terminal and to provide the mobile terminal with connectivity to a packet-switched network and assignment of a network address on the packet-switched network; and
a paging controller configured (i) to page the mobile terminal via the base station in response to the NAS having received from the packet-switched network packet-data destined to the mobile terminal, (ii) to detect failure of the paging, and (iii) responsive to detecting the failure of the paging, to cause the NAS to release the data link layer connection and the assigned network address.

17. The system of claim 16, wherein paging the mobile terminal comprises directing the at least one base station to wirelessly transmit one or more page messages destined the mobile terminal, and wherein detecting failure of the paging comprises a function selected from the group consisting of (i) detecting receipt of a page-reject response from the mobile terminal in response to at least one of the one or more page messages and (ii) detecting absence of receipt from the mobile terminal of a response to the one or more page messages.

18. The system of claim 16, wherein the data link layer connection is a Point-to-Point Protocol (PPP) connection, and wherein causing the NAS to release the data link layer connection comprises transmitting to the NAS a Link Control Protocol (LCP) terminate-request requesting the NAS to close the PPP connection.

19. The system of claim 16, wherein the network address is an Internet Protocol (IP) address, wherein the NAS is a Mobile-IP foreign agent, wherein providing the mobile terminal with the assignment of the network address comprises transmitting to the mobile terminal a Mobile-IP registration-response message from a Mobile-IP home agent assigning the network address to the mobile terminal, and wherein releasing the assigned network address comprises transmitting to the Mobile-IP home agent on behalf of the mobile terminal Mobile-IP de-registration request message.

* * * * *